Feb. 9, 1932.　　　A. DAVIS, JR　　　1,844,868
BUCKET BOX FOR VEHICLE TANKS
Filed June 19, 1928　　6 Sheets-Sheet 1
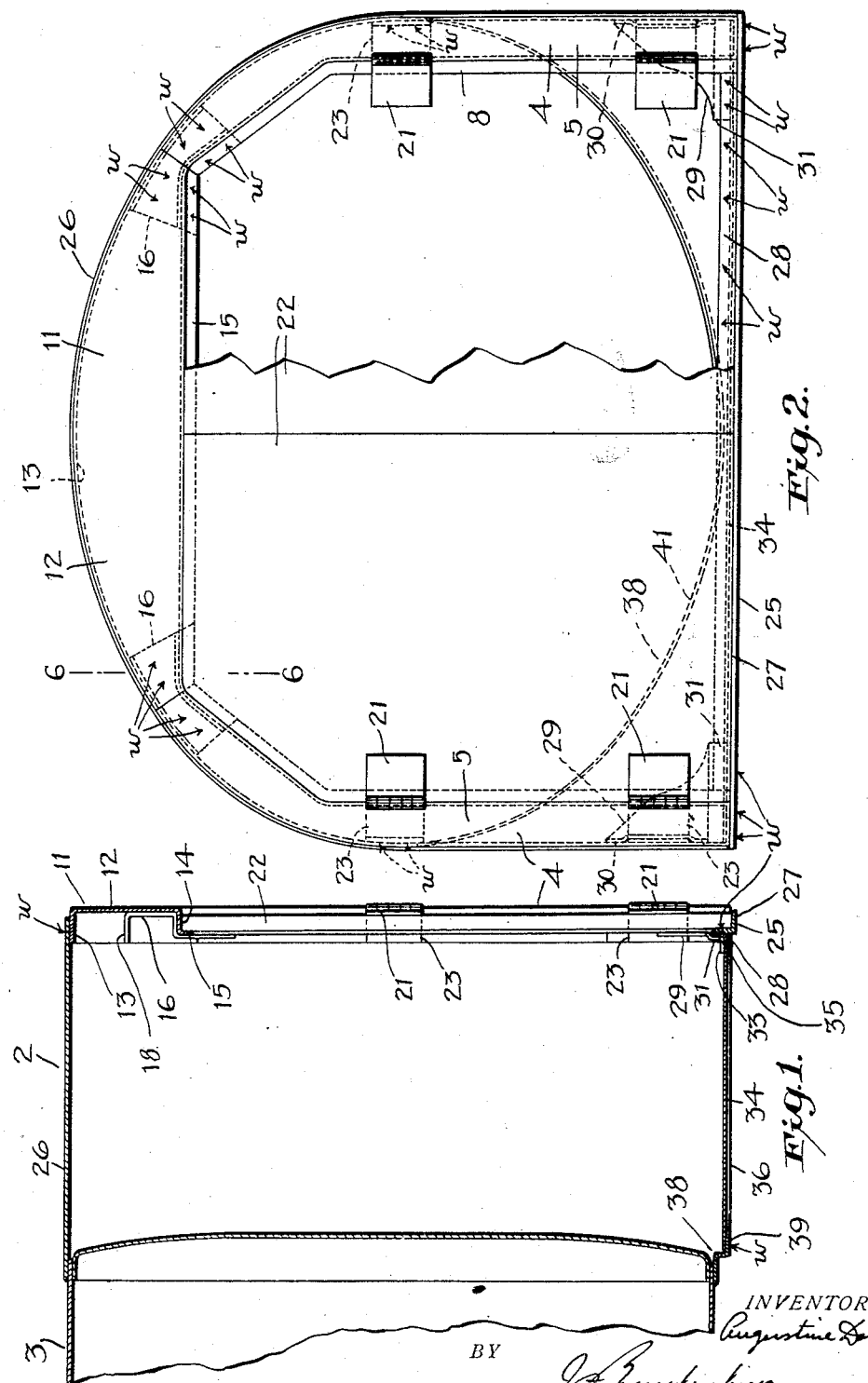
INVENTOR
Augustine Davis Jr.
BY
his ATTORNEY

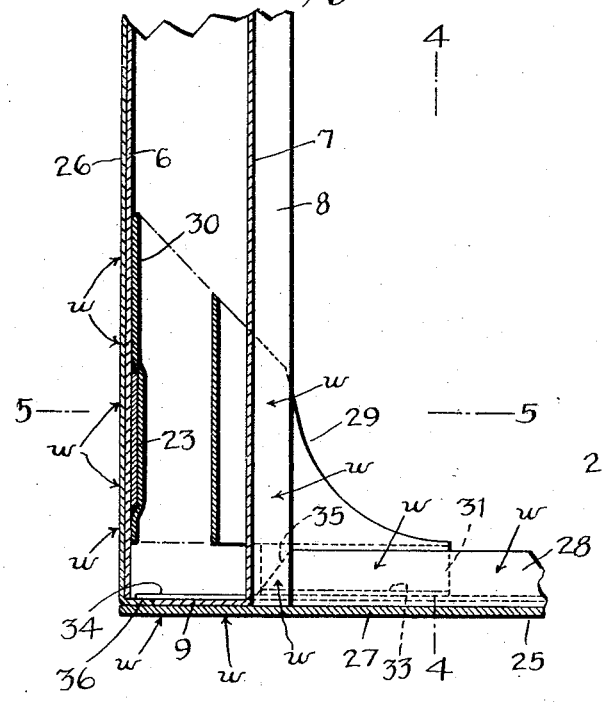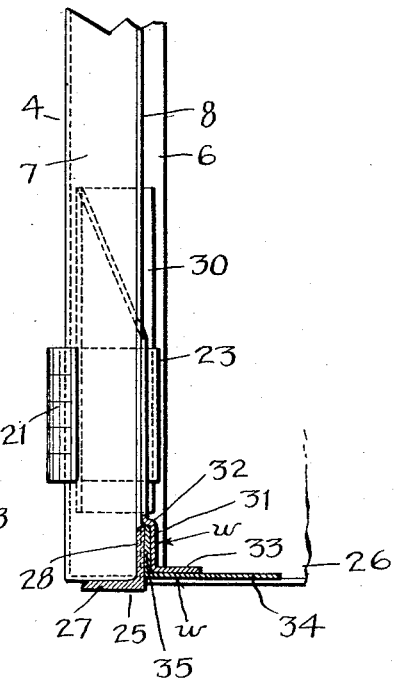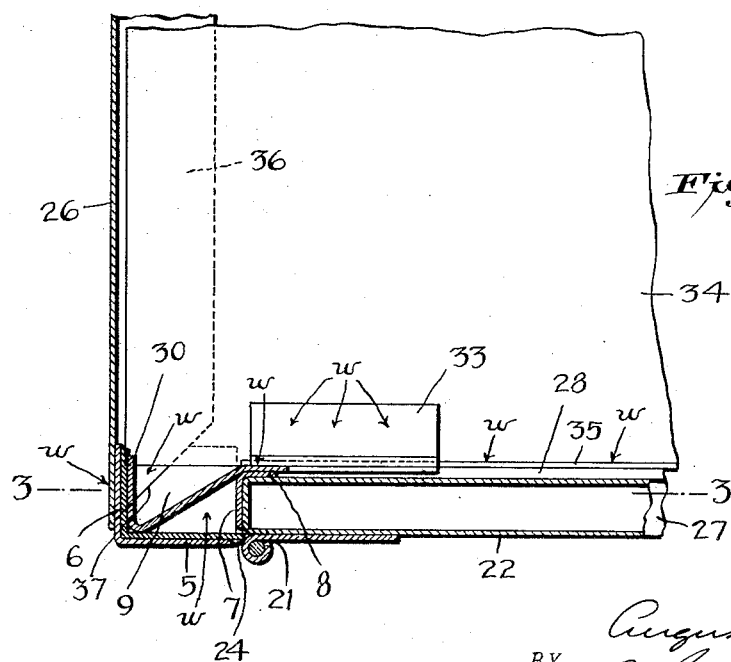

Feb. 9, 1932.    A. DAVIS, JR    1,844,868
BUCKET BOX FOR VEHICLE TANKS
Filed June 19, 1928    6 Sheets-Sheet 3
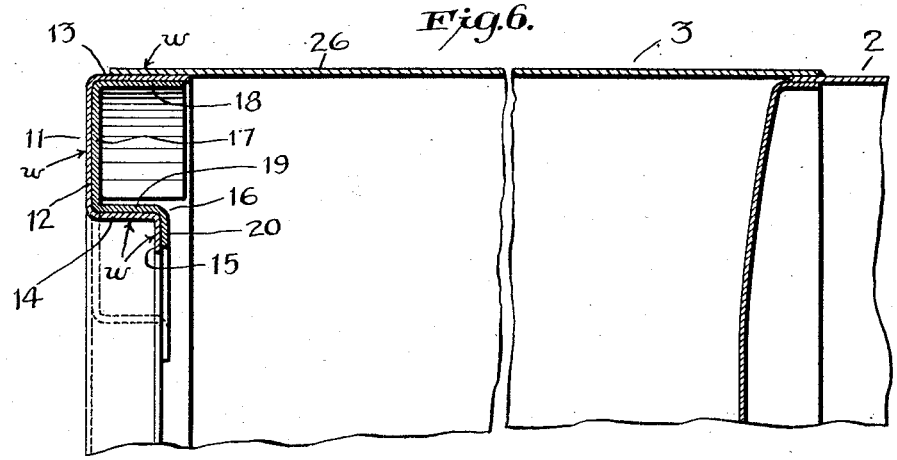
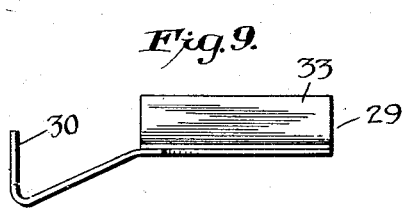
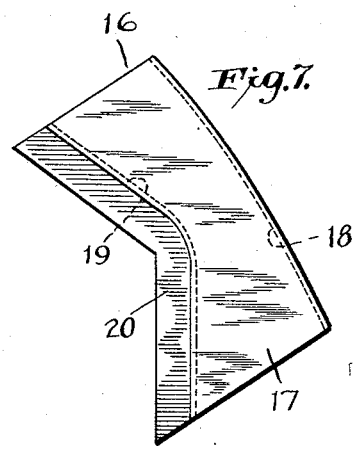
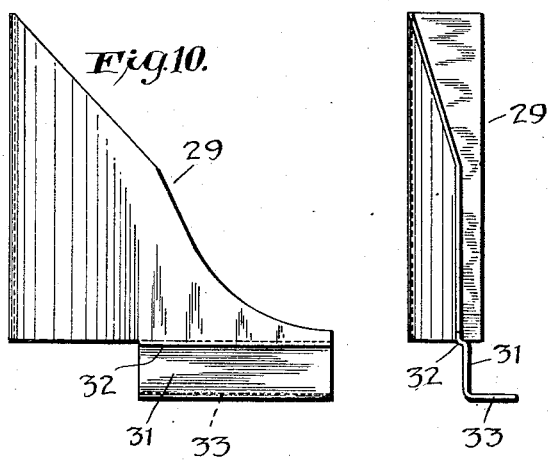
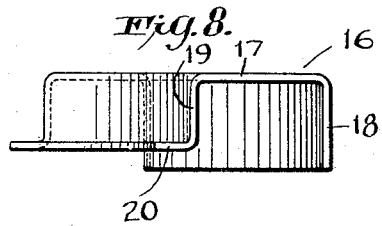
INVENTOR
Augustine Davis, Jr.
BY
his ATTORNEY Feb. 9, 1932.   A. DAVIS, JR   1,844,868
BUCKET BOX FOR VEHICLE TANKS
Filed June 19, 1928   6 Sheets-Sheet 4
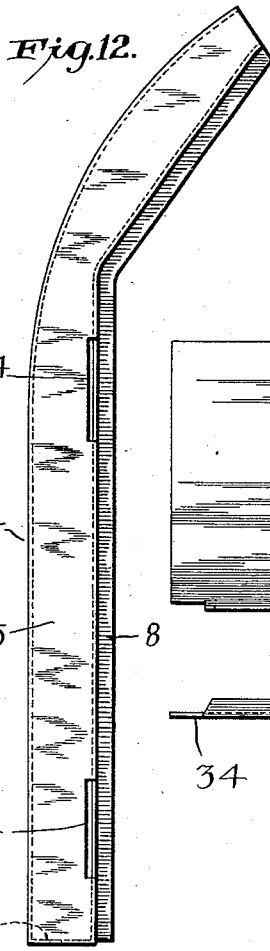
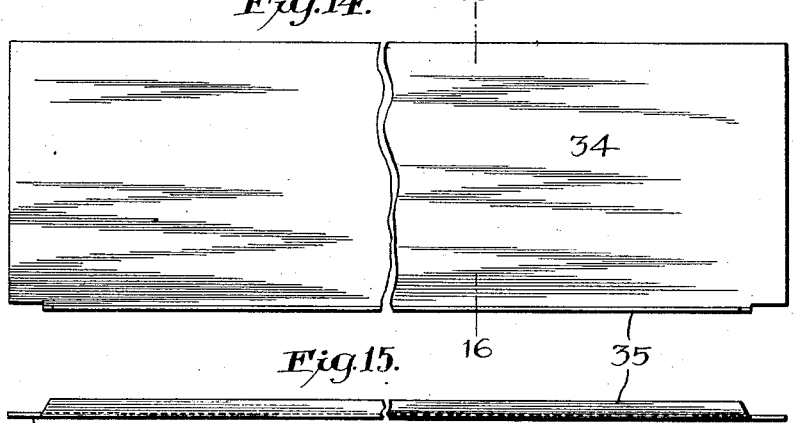
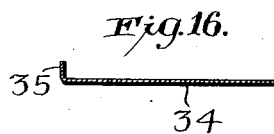
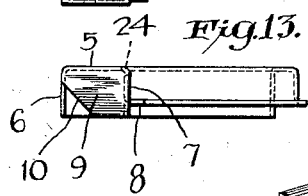
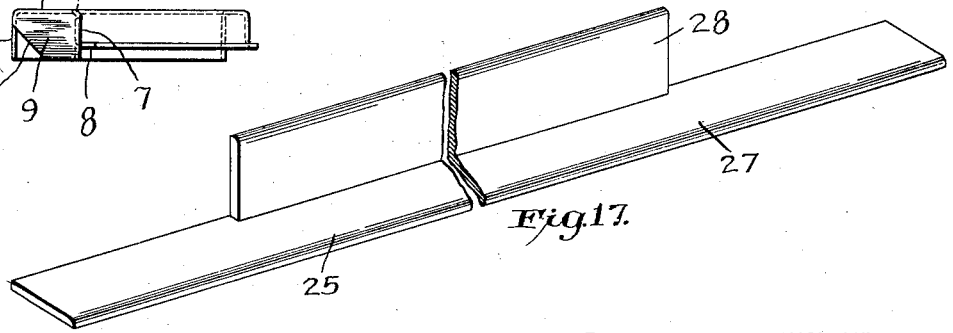
INVENTOR
Augustine Davis, Jr.
BY
ATTORNEY Feb. 9, 1932. A. DAVIS, JR 1,844,868
BUCKET BOX FOR VEHICLE TANKS
Filed June 19, 1928 6 Sheets-Sheet 5
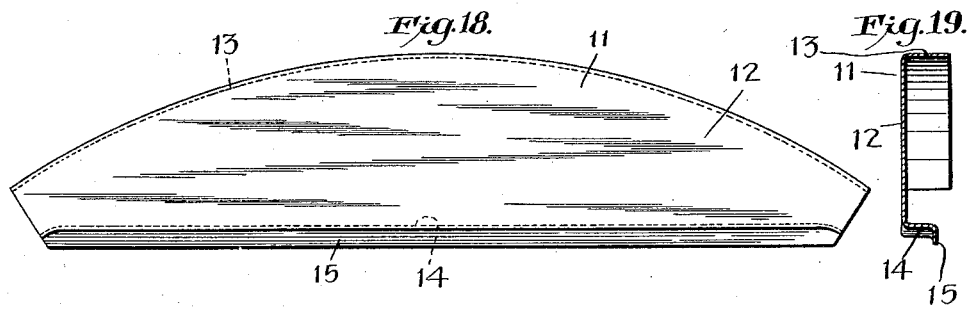
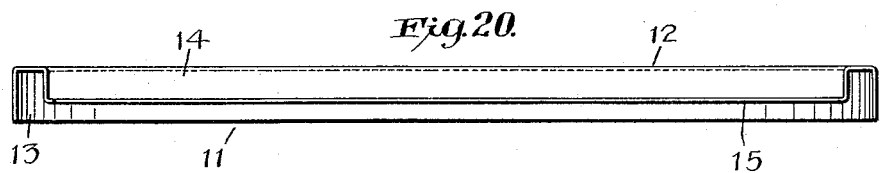
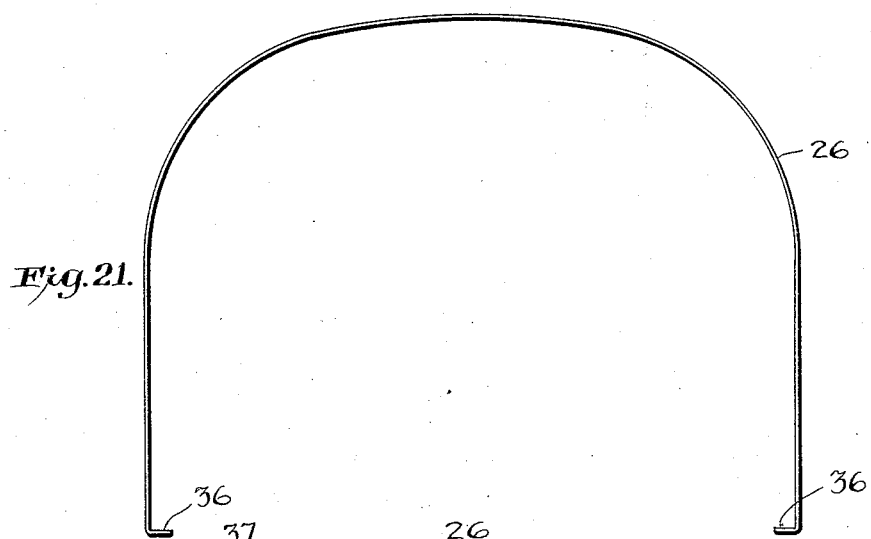
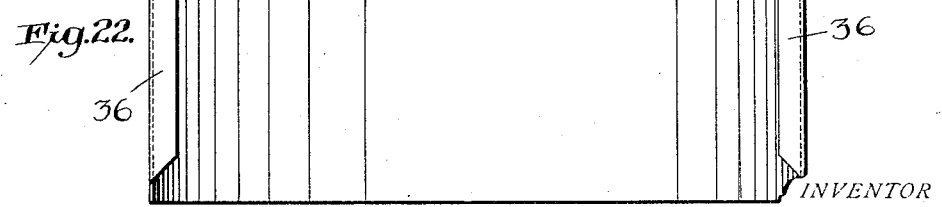

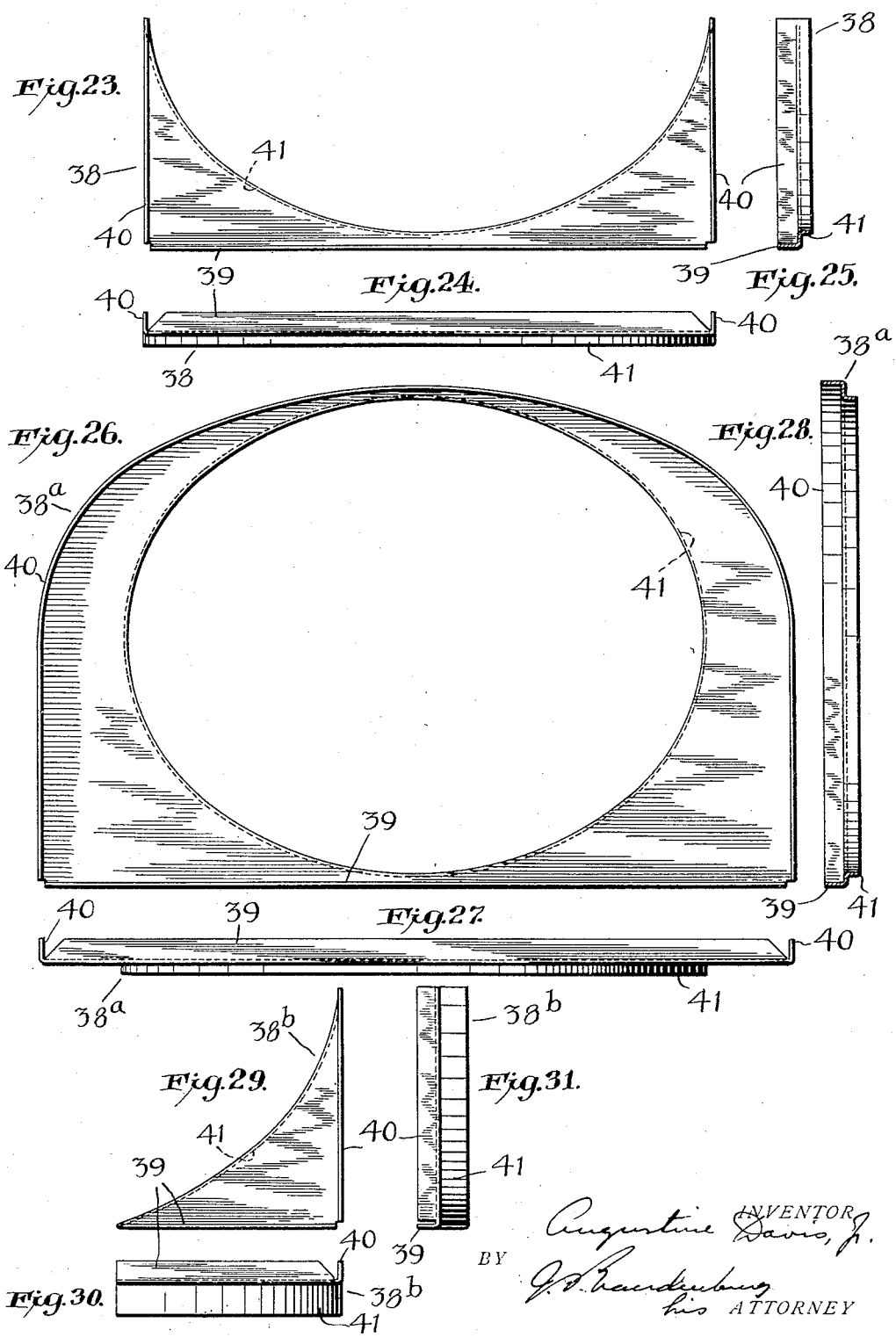

Patented Feb. 9, 1932

1,844,868

UNITED STATES PATENT OFFICE

AUGUSTINE DAVIS, JR., OF CINCINNATI, OHIO

BUCKET-BOX FOR VEHICLE TANKS

Application filed June 19, 1928. Serial No. 286,662.

The invention relates to welded sheet metal bucket-boxes which are united to the rear ends of truck tanks.

The objects are to provide a construction for such boxes which affords exceptional strength and durability for withstanding the shocks and strains to which such structures are subjected, to secure great strength and rigidity without undue weight, to make possible a very smooth exterior finish and close fitting doors, to provide a construction which is especially adapted for pressed steel parts, advantageous for strength and accuracy of joining together, to combine with such pressed steel parts a wrapper sheet or shell which can be formed easily without dies in any length desired for different sizes of box, to provide special reinforcements adding greatly to strength and resistance to distortion, and to provide a type of metal box, which by reason of its construction and the nature of the provision for attaching it to the tank, makes it possible to line the box with a wooden lining and partitions before attaching the box to the tank. This last feature makes it possible to make up the boxes complete with lining and to hold them in stock, whereas other constructions which have been employed heretofore have made it impractical to line the boxes until after they have been welded to the tanks.

Other objects and advantages of the invention will be apparent to those skilled in the art.

The features of the invention can be best understood from the following description, taken in connection with the drawings, and they will be more particularly pointed out in the appended claims.

In the accompanying drawings forming a part hereof:

Fig. 1 is a vertical longitudinal section through the rear end a vehicle tank and united thereto a bucket-box embodying one of the forms of the invention;

Fig. 2 is a rear elevation of the bucket-box, one of two half doors being omitted;

Fig. 3 is a vertical section through one of the front uprights and adjoining parts, taken on the line 3—3 of Fig. 5;

Fig. 4 is a vertical section taken on the line 4—4 of Fig. 3;

Fig. 5 is a horizontal section taken on the line 5—5 of Fig. 3;

Fig. 6 is a vertical section taken on the line 6—6 of Fig. 2;

Fig. 7 is a front elevation of a reinforced member seen in section in Fig. 6;

Fig. 8 is an end view of this member;

Fig. 9 is a top plan view of a corner reinforcement;

Fig. 10 is a front elevation of said corner reinforcement;

Fig. 11 is an edge view thereof;

Fig. 12 is a front elevation of one of the uprights;

Fig. 13 is a bottom plan view of this upright;

Fig. 14 is a top plan view of a bottom plate;

Fig. 15 is a front elevation of the same;

Fig. 16 is a cross-section taken on the line 16—16 of Fig. 14;

Fig. 17 is a perspective view of a transverse tie member, with the intermediate portion broken away because of lack of space;

Fig. 18 is a front elevation of an arch piece;

Fig. 19 is a central vertical section through this piece;

Fig. 20 is a bottom plan view of the same;

Fig. 21 is an edge view of a wrapper sheet or shell;

Fig. 22 is a bottom plan view of the same;

Fig. 23 is a front elevation of a half head such as is employed in Figs. 1 and 2;

Fig. 24 is a bottom plan view of the same;

Fig. 25 is a central vertical section through this half head;

Fig. 26 is a front elevation of a full head;

Fig. 27 is a bottom plan view of this full head;

Fig. 28 is a central vertical section through the same;

Fig. 29 is a front elevation of a quarter head piece;

Fig. 30 is a bottom plan of this piece; and

Fig. 31 is a side view of the same.

The part of the bucket-box 2 farthest from the tank 3 will be termed the front of the box, and the portion of the box which adjoins the tank will be considered the rear part of the box.

The bucket-box is provided with a front structure of great sterength and rigidity, formed of a number of pressed steel pieces united together. Two of these pieces are in the nature of uprights 4, disposed at opposite sides of the door opening, which is framed by the front structure. Each of these uprights is formed in dies from fairly stout sheet metal, so as to present a face wall 5 and outer and inner flanges 6 and 7 extending rearwardly from the face wall. The inner flange 7 of each of these pieces is again flanged inwardly of the door opening, to form a rear flange 8 lying in a vertical transverse plane. A hollow, or partially boxed member is thus produced having great strength despite its comparatively light weight. The flange 8 occupies the position of a door stop, and lends a high degree of stiffness.

The upper portion of each upright 4 is preferably curved inward at the outer side to conform with the arch of the top of the bucket-box. At the inner side, this portion is preferably formed at a straight-line inclination. Each of the upright pieces 4 is provided at the lower end with a bottom wall 9, which is bent rearward from the face wall 5 and welded to the bottom edges of the flanges 6 and 7. The outer rear portion of this bottom wall 9 is preferably cut away on the diagonal line 10 for a purpose which will appear.

An arch or top piece 11 is bent in a manner similar to that of the uprights 4, so that it comprises a face wall 12, an outer or upper flange 13, an inner or lower flange 14, and an inwardly directed rear flange 15. The ends of the arch piece 11 and the upper ends of the upright pieces 4 are formed so as to meet with all of their portions in registry, that is to say the ends of the face wall 12 register with the ends of the face walls 5, the ends of the outer flanges 13 register with the ends of the outer flanges 6, the ends of the inner flanges 14 register with the ends of the inner flanges 7, and the ends of the flange 15 register with the ends of the flanges 8.

These parts are mechanically connected by reinforcement pieces 16. Each of these pieces is pressed from sheet metal to the particular form of the interior of the adjoining portions of the parts 4 and 11. Each of the reinforcements has a front wall 17, outer and inner rearwardly-directed flanges 18 and 19, and an inwardly directed rear flange 20. These reinforcement pieces are pressed into the adjoining portions of the arch and the uprights, bridging the junctions and extending therefrom for some distance in both directions. After these reinforcements are inserted, a perfect union is completed by spot welding through the reinforcements and the arch and uprights at all parts where they overlap. The welds at these regions and elsewhere throughout the construction are indicated rather than illustrated, and are designated by the character w.

Before uniting the uprights and the arch it is desirable to apply the door hinges 21. In the case of double doors 22 (one of which is shown in Fig. 2), which swing horizontally, these hinges are applied to the upright pieces 4. The door or doors fit within the frame formed by the inner flanges 7 and 14, and at the inner side may abut the flanges 8 and 20.

The hinges 21 are made use of to stiffen the portions of the front structure of the box to which they are applied and to prevent buckling of the front face of the structure by the strain put on it by the opening and closing of the doors or by the weight of the doors themselves. The fixed leaves 23 of the hinges, instead of being applied to the face of the uprights 4, are inserted into the interiors of these hollow pieces through slots 24 cut in the forward inner portion of the uprights. Furthermore, the said leaves 23 are bent right angularly so as to lie against the inner sides of the face wall 5 and of the outer flange 6, to both of which the angular leaves are spot welded. In this way a high degree of stiffening and reinforcement is secured for the purposes indicated.

The ends of a transverse sill member 25 are welded to the bottom walls 9 of the uprights 4. This sill member, thus united with the uprights, reinforces and ties together the bottom ends of the uprights, so that in the subsequent operation of welding on the wrapper sheet 26, the ends of the uprights do not become spread apart.

The sill member 25 is in the form of an angle having a horizontal flange 27, forming the bottom of the door opening, and an upstanding rear flange 28 which abuts the flanges 8 and lies in the same plane therewith. The flanges 28 are cut away at the end portions of the sill member which pass beneath the bottom ends of the uprights 4. The flange 28 stiffens the sill member, and is also utilized for other purposes which will be described.

The uprights are further tied together and braced to the tying means by arrangements which will now be described. Two corner reinforcements 29 are placed behind the adjoining portions of the uprights 4 and the sill 27. Each of these reinforcements 29 is a pressed steel member, bent and flanged in a special manner. It is formed to extend upward for a substantial distance at the back of the upright 4, and horizontally for a substantial distance along the sill member 25. As seen in Fig. 10, each of the reinforcement members is of the general form of a triangle, though the specific form may be varied. A portion of this web lies against the inner face of the flange 8 of the upright, and is spot welded. From this region outwardly the web is carried diagonally forward in the interior of the hollow upright 4, into the outer interior angle thereof, and is then bent rearward so as to lie along the inner face of the outer flange 6, and against the hinge leaf 23 at the region where this leaf occurs. The angled portion 30 of this reinforcement is spot welded to the flange 6.

The inner portion of each reinforcement member 29 has a downward extension 31, which is slightly offset rearwardly at 32, and which has a rearwardly directed horizontal foot flange 33.

A bottom plate 34, forming the bottom of the box, is provided with an upturned front flange 35, and the outer portions of this flange lie between the upstanding flange 28 of the sill and the downward extensions 31 of the corner reinforcements 29. These three thicknesses of metal are strongly spot welded together, thereby giving each of the reinforcement members 29 an extended anchorage foundation to the sill members, enabling the corner reinforcements to strongly brace and stiffen the uprights. This part of the construction also makes use of the floor plate to further tie the uprights together at the bottom. The flange 35 of the floor plate is likewise welded to the flange 28 of the sill member throughout its length, or at intervals throughout its length, between the corner reinforcements, so that the sill member and the floor plate are mutually strengthened and the floor plate is supported across its front.

The bracing effect of the corner reinforcements is further increased by the foot flanges 33 which bear against the floor plate 34 and are welded to it.

After the parts which have been described have been put together, the wrapper sheet 26 is applied. This wrapper sheet or shell can be economically formed with rolls and brakes to the contour of the front structure without employing dies. The front portion of the wrapper sheet overlaps the arch 11 and the uprights 4, and is welded to their outer flanges 13 and 6. The lower ends of the side walls of the wrapper sheet or shell are inturned at 36, to form ledges which underlie and are welded to the floor plate 34 at opposite sides of the box. The front ends of the flanges 36 are mitred at 37 to meet the mitred portion 10 of the bottom walls 9 of the uprights 4, so as to secure a flush surface at these regions.

The remaining part of the metal construction of the bucket-box consists of a rear head piece or head pieces formed of sheet metal, cut and pressed in dies, with flanges to conform to the contour of the bucket-box and to the contour of the tank 3. In Figs. 1, 2, 23, 24 and 25 a half head 38 is illustrated, this head fitting the lower half, more or less, of the box and the lower half, more or less, of the tank. Externally this head is of the rectangular form of the lower part of the box, and interiorly it is cut out to approximately semi-elliptical form to correspond with the outline of the tank. It is formed with a forwardly extending bottom flange 39, forwardly extending vertical side flanges 40, all bent from the external edges of the plate, and with a rearwardly directed flange 41 bent from the curved internal edge of the plate. The flange 39 supports the rear portion of the floor plate 34, and is welded to it. The flanges 40 are lapped by the rear edge of the wrapper sheet, which is welded to these flanges. The flange 41 is formed to telescope over the lower half of the rear end of the tank 3, to which this flange is welded, preferably by the oxyacetylene process. In the upper half of the bucket-box and the tank the wrapper sheet 26 telescopes over the rear end of the tank, in a manner similar to that of the flange 41 of the half head, and is similarly welded to the tank.

For a larger bucket-box a full head 38ᵃ, such as shown in Figs. 26, 27 and 28, is employed. This head is wider than the half head, and its upper half is completed, so that the flanges 40 are continuous over the top, and the flange 41 forms a continuous circuit, telescoping with the end of the tank. The wrapper sheet in this instance is welded in the upper half as well as in the lower half to the continuous flange 40.

The large head 38ᵃ requires a longer wrapper sheet than the half head 38, and one of the advantages of the wrapper sheet is that it can be readily cut to the length desired for any height and width of bucket-box.

The construction of the front part of the box of pieces which are united together in the manner described enables this structure to be modified according to the size of box desired by using arch pieces 11 of different lengths, without necessarily requiring uprights 4 of different heights.

For certain sizes of tanks and boxes two quarter heads 38ᵇ, such as shown in Figs. 29, 30 and 31, may be used instead of the half head 38 or the full head 38ᵃ. These quarter heads conform to the lower quarters, more or less, of the box and tank, and they are flanged similarly to the other forms of head pieces.

I realize that there may be numerous changes in various details and arrangements without departing from the essentials of the invention.

I claim:

1. A welded sheet-metal bucket-box construction for a vehicle tank, comprising two front upright pieces each bent to form a face wall and outer and inner rearwardly directed flanges, an arch piece bent to form a face wall and outer and inner rearwardly directed flanges, said arch piece united by welding with said upright pieces, a transverse sill piece welded to the lower ends of said upright pieces and tying the same together, said inner flanges framing a door opening, and a wrapper sheet lapped and welded to the outer flanges of said upright and arch pieces.

2. A welded sheet-metal bucket-box construction for a vehicle tank, comprising two front upright pieces, each bent to form a face wall and outer and inner rearwardly directed flanges, an arch piece bent to form a face wall and outer and inner rearwardly directed flanges, said arch piece united by welding with said upright pieces, a transverse sill piece welded to the lower ends of said upright pieces and tying the same together, said inner flanges framing a door opening, a wrapper sheet welded to the outer flanges of said upright and arch pieces, and a rear head piece bent to present a forwardly directed flange lapped by and welded to the wrapper sheet and a rearwardly directed flange adapted to be telescoped over the rear end of the tank.

3. A welded sheet-metal bucket-box construction for a vehicle tank, comprising two front upright pieces each bent to form a face wall and outer and inner rearwardly directed flanges, an arch piece bent to form a face wall and outer and inner rearwardly directed flanges, said arch piece united by welding with said upright pieces, a transverse sill piece welded to the lower ends of said upright pieces and tying the same together, said inner flanges framing a door opening, a wrapper sheet lapping and welded to the outer flanges of said upright and arch pieces, a floor plate united to the lower ends of said wrapper sheet and to said sill piece, and a rear head piece bent to present forwardly directed flanges lapped by and welded to said wrapper sheet and welded to said floor plate, and a rearwardly directed flange adapted to be telescoped with the rear end of the tank.

4. A welded sheet-metal bucket-box construction for a vehicle tank, comprising two front upright pieces each bent to form a face wall and outer and inner rearwardly directed flanges, an arch piece bent to form a face wall and outer and inner rearwardly directed flanges, said arch piece united by welding with said upright pieces, a transverse sill piece welded to the lower ends of said upright pieces and tying the same together, said inner flanges framing a door opening, a wrapper sheet lapping and welded to the outer flanges of said upright and arch pieces, said wrapper sheet having inwardly directed bottom flanges, a floor plate united to the bottom flanges of said wrapper sheet and to said sill piece, and a rear head piece bent to present forwardly directed flanges lapped by and welded to said wrapper sheet and said floor plate, and a rearwardly directed flange adapted to be telescoped with the rear end of the tank.

5. A welded sheet-metal bucket-box construction for a vehicle tank, comprising two front upright pieces each bent to form a face wall, outer and inner rearwardly directed flanges and a rear flange directed inwardly from the inner flange, an arch piece bent to form a face wall, outer and inner rearwardly directed flanges and a rear flange directed inwardly from the inner flange, said arch piece united by welding with said upright pieces, said inner flanges framing a door opening, and a wrapper sheet lapping and welded to the outer flanges of said upright and arch pieces.

6. A welded sheet-metal bucket-box construction for a vehicle tank, comprising two front uprights each bent to form a face wall and outer and inner rearwardly directed flanges, an arch bent to present a face wall and rearwardly directed outer and inner flanges, the ends of said arch meeting the upper ends of said uprights, and reinforcement pieces bent with rearwardly directed outer and inner flanges and formed to fit inside said uprights and arch at the junction regions, said reinforcement pieces welded to said uprights and arch.

7. In a welded sheet-metal bucket-box construction for a vehicle tank, a separate front structure comprising two front uprights each bent to form a face wall, outer and inner rearwardly directed flanges and a rear flange directed inwardly from the inner flange, an arch joined with said uprights and bent to form a face wall, outer and inner rearwardly directed flanges and a rear flange directed inwardly from the inner flange, and a transverse sill piece united with and tying together the lower ends of said uprights and comprising a horizontal flange and a rear vertical flange.

8. A welded sheet-metal bucket-box construction comprising two front uprights formed with outer and inner flanges, a similarly flanged arch joined with the uprights, and a floor plate having an upstanding front flange joined with and tying together said uprights.

9. A welded sheet-metal bucket-box construction comprising two front uprights formed with outer and inner flanges, a similarly flanged arch joined with the uprights, a transverse sill piece joined with and tying together the lower ends of said uprights, and a floor plate having an upstanding front flange joined so as to afford a further tie between said uprights.

10. In a welded sheet-metal bucket-box construction for a vehicle tank, a front structure comprising hollow uprights at each side of the door opening, said uprights bent with outer and inner flanges, a transverse member tying said uprights together at the bottom, and corner reinforcements joined with said tie member and carried as braces into the interiors of said uprights and rearwardly flanged at their outer portions, said rearwardly flanged outer portions lying against and welded to the outer flanges of said uprights.

11. In a welded sheet-metal bucket-box construction for a vehicle tank, a front structure comprising hollow uprights at each side of the door opening, said uprights bent with outer and inner rearwardly directed flanges, and with flanges directed inwardly from said inner flanges, and reinforcement welded to said inwardly directed flanges and carried into the interiors of said uprights, said reinforcements bearing in the outer angles of said uprights and having rearwardly directed outer flanges welded to the outer flanges of the uprights.

12. In a welded sheet-metal bucket-box construction for a vehicle tank, a front structure comprising hollow uprights at each side of the door opening, said uprights bent with outer and inner rearwardly directed flanges, and with flanges directed inwardly from said inner flanges, a transverse bottom tie member welded to said uprights and provided with an upstanding rear flange, and corner reinforcements jointed with said inwardly directed flanges of the uprights and to said upstanding flanges of said tie member, said reinforcements extending forward in said hollow uprights into the outer angles thereof and having rearwardly directed outer flanges lying against and welded to the outer flanges of the uprights.

13. In a welded sheet-metal bucket-box construction for a vehicle tank, a front structure comprising hollow uprights at each side of the door opening, said uprights bent with outer and inner flanges, a transverse bottom tie member welded to the lower ends of said uprights and having an upstanding rear flange, corner reinforcements carried within said uprights and welded thereto, said reinforcements having portions parallel and adjacent the inner side of said upstanding flange, and a floor plate having an upturned front flange between said portions and said upstanding flange, said portions, said upstanding flange and said front flange being welded together.

14. In a welded sheet-metal bucket-box construction for a vehicle tank, a front structure comprising hollow uprights at each side of the door opening, said uprights bent with outer and inner flanges, a transverse bottom tie member welded to the lower ends of said uprights and having an upstanding rear flange, corner reinforcements carried within said uprights and welded thereto, said reinforcements having portions welded to said upstanding flange, and a bottom plate welded to said tie member, said portions having foot flanges bearing on top of said floor plate.

15. In a welded sheet-metal bucket-box construction for a vehicle tank, a front structure comprising hollow uprights at each side of the door opening, said uprights bent with outer and inner flanges, a transverse bottom tie member welded to the lower ends of said uprights and having an upstanding rear flange, corner reinforcements carried within said uprights and welded thereto, said reinforcements having portions adjacent the inner side of said upstanding flange, and a floor plate having an upturned front flange between said portions and said upstanding flange, said portions, said upstanding flange and said front flange being welded together, said portions having rearwardly directed horizontal foot flanges bearing on top of said floor plate.

16. In a welded sheet-metal bucket-box construction, the combination with a hollow door frame member bent to form a face wall and rearwardly directed outer and inner flanges, said member having a hinge opening, of a door hinge having one leaf extending through said opening into the interior of said member and welded therein, said leaf being bent to lie against the outer flange of said member.

17. In a welded sheet-metal bucket-box construction, the combination with a hollow door frame member bent to form a face wall and rearwardly directed outer and inner flanges, said member having a hinge opening, of a door hinge having one leaf extending through said opening into the interior of said member and welded therein, said leaf comprising portions in angular relation lying against the inner sides of said face wall and said outer flange and welded thereto.

18. A welded sheet-metal bucket-box construction, comprising two hollow uprights bent with outer and inner rearwardly directed flanges, a similarly flanged arch united by welding with said uprights, a transverse tie member welded to the lower ends of said uprights, a wrapper sheet lapping and welded to the outer flanges of said uprights and arch, a bottom plate welded to said wrapper sheet and to said tie member, and a rear head piece bent with forwardly directed flanges lapped by and welded to said wrapper sheet and bottom plate and with a rearwardly directed flange adapted to be telescoped with the end of the tank.

19. A welded sheet-metal bucket-box construction for vehicle tanks, comprising flanged front upright pieces at opposite sides of the door opening, a flanged arch piece united by welding to the upper ends of said uprights, a sill piece welded to the lower ends of said upright pieces, a flanged head piece formed interiorly to be welded to the end of a tank, and a wrapper sheet overlapping and welded to rearwardly directed flanges of said upright and arch pieces and to a forwardly directed flange of said head piece.

AUGUSTINE DAVIS, Jr.